United States Patent
Lu et al.

(10) Patent No.: US 7,913,503 B2
(45) Date of Patent: *Mar. 29, 2011

(54) REFRIGERANT EXPANSION ASSEMBLY WITH PRESSURE RELIEF

(75) Inventors: Jan Lu, Troy, MI (US); Harry E. Eustice, Troy, MI (US); Edwin J. Stanke, Pontiac, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/125,083

(22) Filed: May 22, 2008

(65) Prior Publication Data
US 2009/0288435 A1    Nov. 26, 2009

(51) Int. Cl.
*F25B 41/04* (2006.01)
(52) U.S. Cl. ............ 62/222; 62/511; 236/92 B
(58) Field of Classification Search ......... 236/92 B, 236/92 C; 62/197, 222, 511; 137/12, 462
See application file for complete search history.

(56) References Cited

U.S. PATENT DOCUMENTS

| | | | |
|---|---|---|---|
| 2,594,701 A | | 4/1952 | Wolf |
| 2,841,174 A | * | 7/1958 | Frye ............... 137/514.5 |
| 5,251,459 A | * | 10/1993 | Grass et al. ............ 62/324.1 |
| 5,277,364 A | * | 1/1994 | Heffner et al. ............ 236/92 B |
| 5,597,117 A | * | 1/1997 | Watanabe et al. ......... 236/92 B |
| 6,334,324 B1 | * | 1/2002 | Muta et al. ................ 62/222 |
| 6,691,924 B1 | * | 2/2004 | Vestergaard et al. ...... 236/92 B |
| 7,707,844 B2 | * | 5/2010 | Nestler et al. .............. 62/222 |
| 2008/0029165 A1 | | 2/2008 | Beck |
| 2009/0288434 A1 | * | 11/2009 | Lou et al. ................. 62/222 |
| 2010/0186434 A1 | * | 7/2010 | Lou et al. ................. 62/222 |

FOREIGN PATENT DOCUMENTS

| | | |
|---|---|---|
| EP | 1832789 A2 | 12/2007 |
| JP | 2007178066 A | 7/2007 |
| WO | WO2006079408 A1 | 8/2006 |

* cited by examiner

*Primary Examiner* — Marc E Norman

(57) ABSTRACT

A refrigerant expansion assembly, and method of operation, for use in a vehicle air conditioning system is disclosed. The assembly has a main body including an orifice inlet port, an orifice outlet port, an orifice channel extending between the orifice inlet and outlet ports and including a fixed orifice, an upstream bypass channel extending from the orifice channel between the orifice inlet port and the fixed orifice and including a valve seat, and a downstream bypass channel extending from the orifice channel between the fixed orifice and the orifice outlet port. A bypass valve flange extends from the main body, forming a bypass chamber connected to the upstream bypass channel and the downstream bypass channel, with the ball valve seat adjacent to the bypass chamber. A check ball mounts in the bypass chamber adjacent to the valve seat, and a spring biases the check ball into the valve seat.

20 Claims, 3 Drawing Sheets

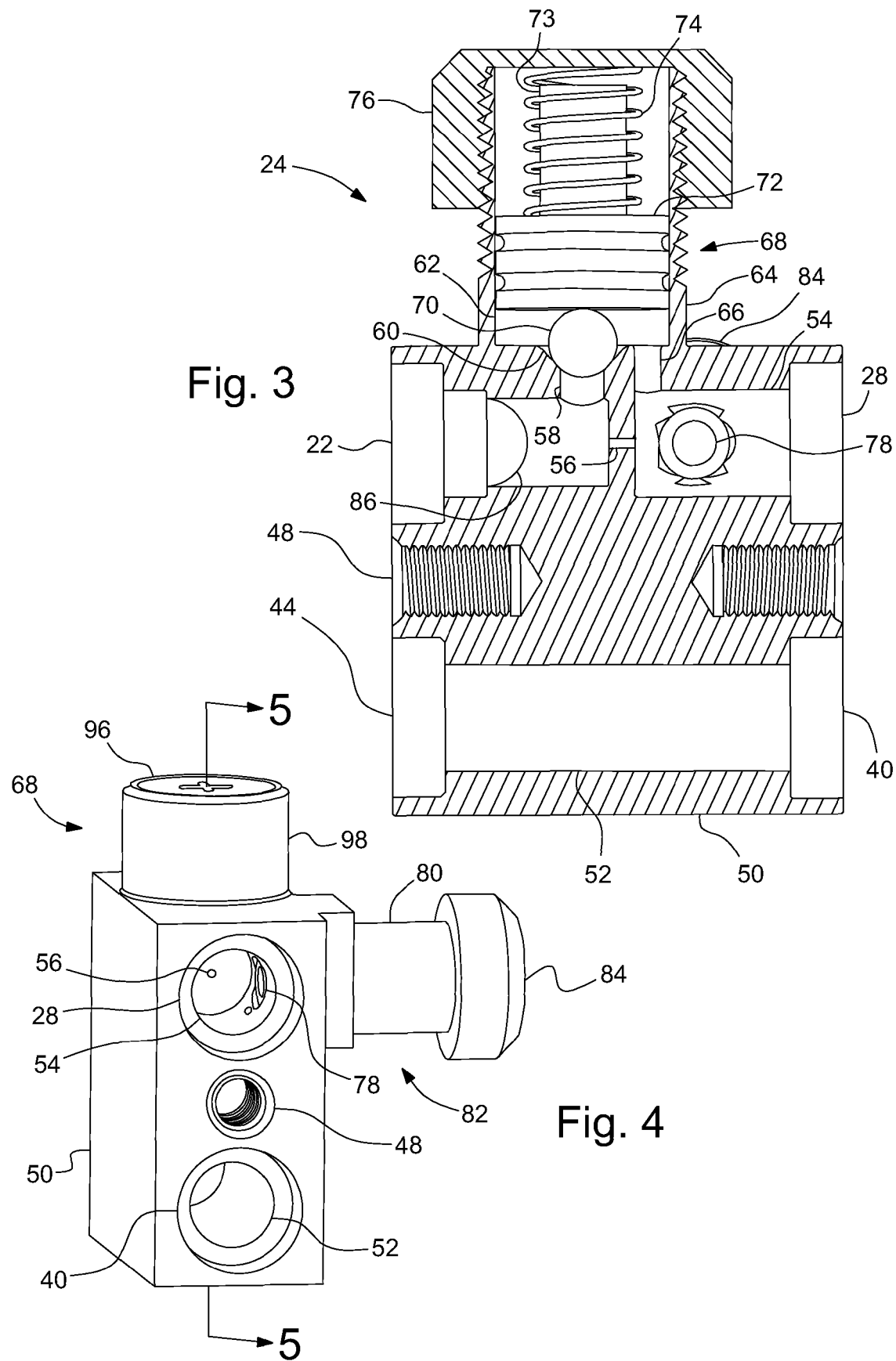

REFRIGERANT EXPANSION ASSEMBLY WITH PRESSURE RELIEF

BACKGROUND OF INVENTION

The present invention relates generally to vehicle air conditioning systems and more particularly to refrigerant expansion devices for vehicle air conditioning systems that employ higher pressure, non-conventional refrigerants.

New regulations for refrigerants used in vehicle air conditioning systems are causing some vehicle air conditioning systems to employ refrigerants that operate at much higher pressures than conventional refrigerants used in vehicles. With these much higher pressures, the typical expansion devices used with the conventional refrigerants are not adequate. Accordingly, some have modified thermal expansion valves to operate at the higher pressures of the new refrigerants, but drawbacks exist with the diaphragm located in the thermal expansion valve between the inflow refrigerant stream and the outflow refrigerant stream, and with a tube used for a temperature sensor, which is easily broken during assembly. Others have attempted to provide orifice tubes that can be used with the higher pressure refrigerants by providing a burst disk to protect an evaporator from overpressure and a bellows assembly coaxial with the orifice that is employed as a refrigerant bypass. But this orifice tube assembly is overly complex and expensive to fabricate and assemble. So it is desired to provide an expansion device capable of operating under the high pressures of newer vehicle refrigerants while providing for a relatively inexpensive and simple design that performs the desired functions.

SUMMARY OF INVENTION

An embodiment contemplates a refrigerant expansion assembly for use in a vehicle air conditioning system. The assembly may comprise a main body including an orifice inlet port, an orifice outlet port, an orifice channel extending between the orifice inlet port and the orifice outlet port and including a fixed orifice, an upstream bypass channel extending at a non-parallel angle from the orifice channel between the orifice inlet port and the fixed orifice and including a ball valve seat, and a downstream bypass channel extending at a non-parallel angle from the orifice channel between the fixed orifice and the orifice outlet port. A bypass valve flange may extend from the main body and form a bypass chamber therein, with the bypass chamber connected to the upstream bypass channel and the downstream bypass channel, and with the ball valve seat adjacent to the bypass chamber. A check ball may be mounted in the bypass chamber adjacent to the ball valve seat, with a spring biasing the check ball into the ball valve seat.

An embodiment contemplates a vehicle air conditioning system comprising a refrigerant compressor, a condenser configured to receive a refrigerant from the refrigerant compressor, an evaporator, and a refrigerant expansion assembly. The refrigerant expansion assembly may include an orifice inlet port that receives the refrigerant from the condenser, an orifice outlet port that directs the refrigerant to the evaporator, an orifice channel extending between the orifice inlet port and the orifice outlet port and including a fixed orifice, an upstream bypass channel extending at a non-parallel angle from the orifice channel between the orifice inlet port and the fixed orifice and including a ball valve seat, and a downstream bypass channel extending at a non-parallel angle from the orifice channel between the fixed orifice and the orifice outlet port. The assembly may also include a bypass valve flange extending from the main body and forming a bypass chamber therein, with the bypass chamber connected to the upstream bypass channel and the downstream bypass channel, and with the ball valve seat adjacent to the bypass chamber. A check ball is mounted in the bypass chamber adjacent to the ball valve seat, and a spring operatively engages the check ball to bias the check ball into the ball valve seat, whereby when a refrigerant pressure in the upstream bypass channel exceeds a first predetermined pressure threshold, the check ball is moved away from the ball valve seat against the bias of the spring.

An embodiment contemplates a method of operating a vehicle air conditioning system having a refrigerant expansion assembly, the method comprising the steps of: directing a refrigerant through an orifice inlet port, an orifice channel, having a fixed orifice, and an orifice outlet port prior to directing the refrigerant into an evaporator; applying a refrigerant pressure to a check ball, against a bias of a spring, upstream of the fixed orifice; pushing the check ball against the bias of the spring into an open position when the refrigerant pressure exceeds a first predetermined pressure threshold, allowing the refrigerant to flow past the check ball through a bypass chamber to thereby bypass the fixed orifice; and the spring biasing the check ball into a closed position when the refrigerant pressure drops below the first predetermined pressure threshold, thereby forcing all of the refrigerant to flow through the fixed orifice.

An advantage of an embodiment is that the refrigerant expansion assembly has both an orifice bypass valve to relieve high pressure upstream of the orifice, and a pressure relief valve that will release refrigerant pressure when the pressure is high enough that damage to the evaporator is possible—all in a relatively simple, inexpensive and reliable assembly. The pressure relief is particularly useful when employing refrigerants that operate at a higher pressure than conventional vehicle refrigerants, such as, for example, carbon dioxide refrigerant systems. The orifice bypass valve is a simple, inexpensive and reliable design for achieving the desired pressure relief.

An advantage of an embodiment is that a refrigerant filter member is removable for service, thus reducing costs associated with assembly and servicing of a clogged filter.

An advantage of an embodiment is that the refrigerant expansion assembly includes a compact design with four parallel port connections, thus allowing for easier packaging in the vehicle.

BRIEF DESCRIPTION OF DRAWINGS

FIG. 3 is a partially sectional view taken along line 3-3 in FIG. 2.

FIG. 4 is a perspective view of a refrigerant expansion assembly according to a second embodiment.

DETAILED DESCRIPTION

Figure 1:
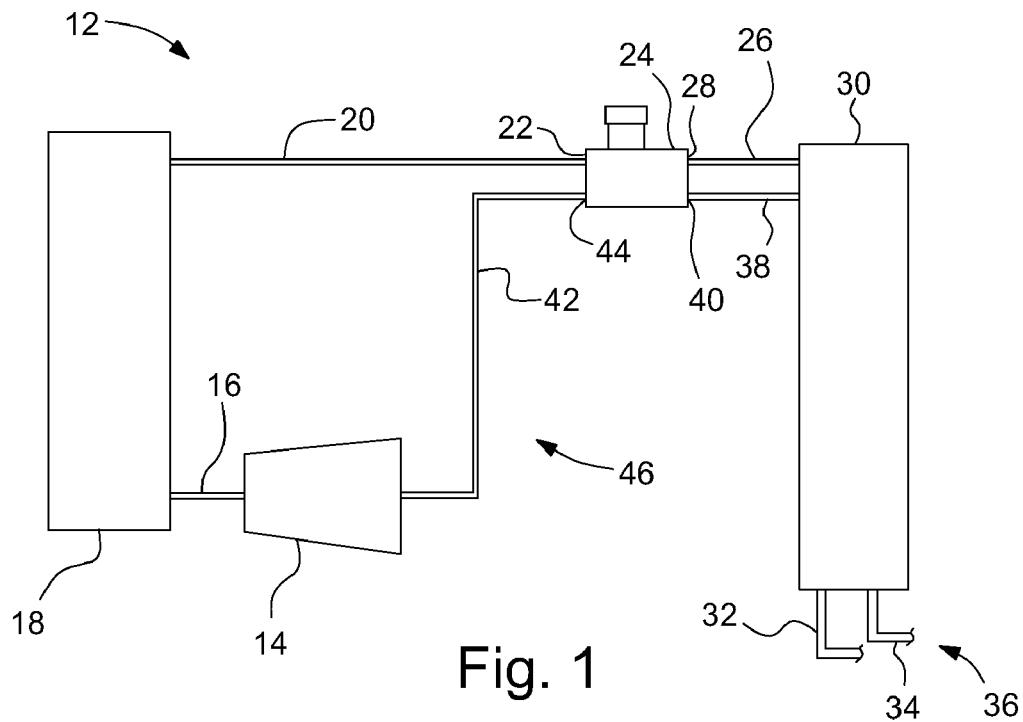
FIG. 1 is a schematic view of an air conditioning system employing a refrigerant expansion assembly according to a first embodiment.

FIG. 1 illustrates a portion of a vehicle air conditioning system 12 for use with alternative refrigerants operating at a much higher pressure than conventional refrigerants used in automotive vehicles. The high pressure refrigerant may be, for example, carbon dioxide refrigerant rather than conventional automotive refrigerants such as R134a or Freon. The air conditioning system 12 includes a refrigerant compressor 14 that compresses a refrigerant before sending it through a refrigerant line 16 to a condenser 18, where heat energy is removed from the refrigerant. Another refrigerant line 20 directs the refrigerant from the condenser 18 to an orifice inlet port 22 of a refrigerant expansion assembly 24. Still another refrigerant line 26 connects between an orifice outlet port 28 of the expansion assembly 24 and an evaporator 30.

The evaporator 30 is also sometimes referred to as a chiller and includes a secondary loop outlet line 32 and a secondary loop inlet line 34, which may carry a liquid, such as, for example, coolant, through a secondary loop 36 (only a portion of which is shown) of the air conditioning system 12. Alternatively, the evaporator 30 may act as a more conventional evaporator, without a secondary loop in the air conditioning system. In either case, another refrigerant line 38 extends from the evaporator 30 to a return inlet port 40 of the refrigerant expansion assembly 24, and another refrigerant line 42 extends from a return outlet port 44 of the expansion assembly 24 to the compressor 14 to complete a refrigerant loop 46 of the vehicle air conditioning system.

Figure 2:
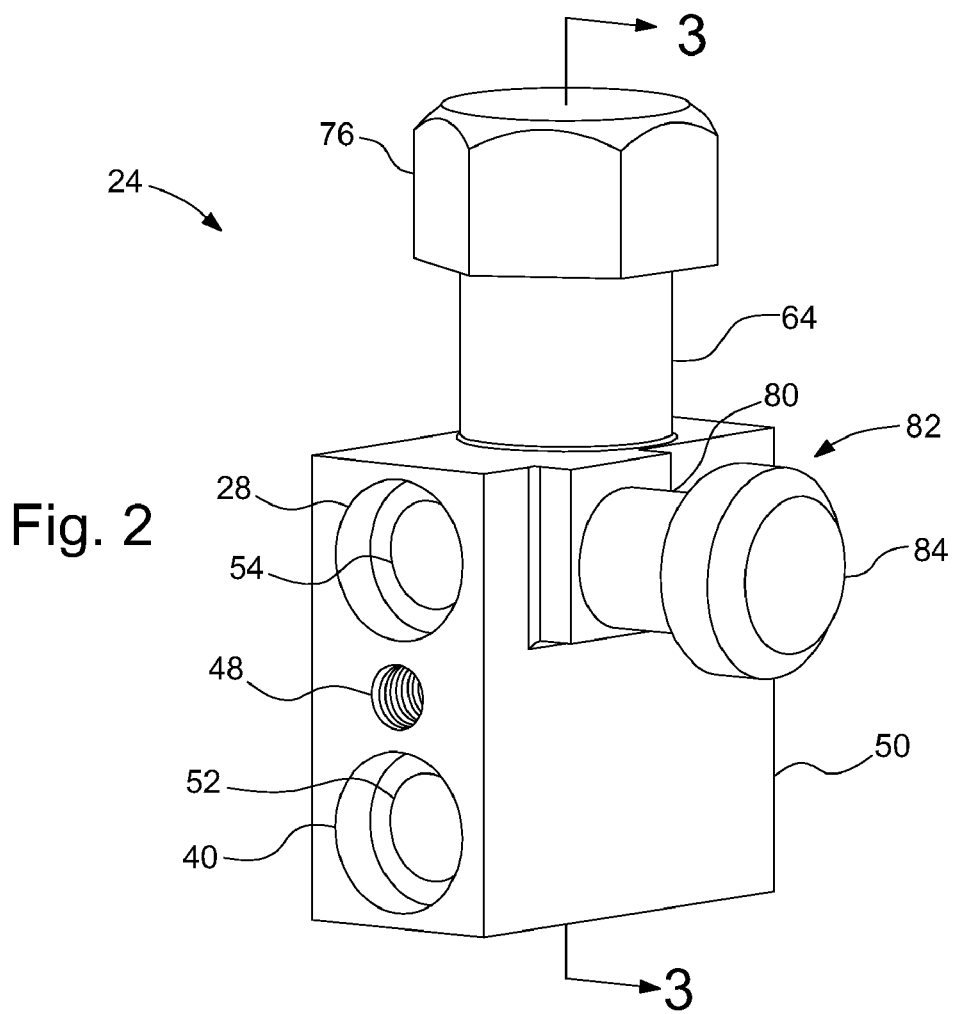
FIG. 2 is a perspective view of the refrigerant expansion assembly according to the first embodiment.

FIGS. 2 and 3 illustrate a first embodiment of the refrigerant expansion assembly 24 shown in FIG. 1 in more detail. The refrigerant expansion assembly 24 has a main body 50 that defines a pair of mounting bores 48 for mounting the assembly 24.

The main body 50 also defines the orifice inlet port 22, the orifice outlet port 28, the return inlet port 40 and the return outlet port 44. The return inlet port 40 and the return outlet port 44 are coaxially aligned with each other and are connected by a refrigerant return channel 52 extending through the main body 50. The orifice inlet port 22 and the orifice outlet port 28 are coaxially aligned with each other and extend parallel to the return inlet and outlet ports 40, 44, but do not connect with or have any interaction with the return inlet and outlet ports 40, 44 (as is the case with a thermal expansion valve that has an opening between the orifice ports and the return ports that is covered with a diaphragm that is used to affect the valve opening). The orifice inlet port 22 is connected to the orifice outlet port 28 by an orifice channel 54 extending through the main body 50, with the orifice channel 54 including a fixed orifice 56.

An upstream bypass channel 58 extends perpendicular from the orifice channel 54—just upstream of the fixed orifice 56—to a valve seat 60 that opens into a bypass chamber 62 defined by a bypass valve flange 64 extending from the main body 50. A downstream bypass channel 66 extends from the bypass chamber 62 just downstream of the fixed orifice 56. An orifice bypass valve 68 includes a check ball 70, bypass piston 72 and a coil spring 74, all located in the bypass chamber 62. The check ball 70 is biased toward the valve seat 60 by the action of the coil spring 74 pressing against the bypass piston 72. The opposite end of the coil spring 74 is retained by a spring retention nut 76 that screws onto the bypass valve flange 64.

A pressure relief valve 82 includes a pressure relief outlet channel 78 extending from the orifice channel 54 between the fixed orifice 56 and the orifice outlet port 28. The pressure relief outlet channel 78 extends through a pressure relief flange 80 to a burst disk portion 84 of the pressure relief valve 82 at the end of the pressure relief flange 80.

A removable filter 86 is mounted in the orifice channel 54 adjacent to the orifice inlet port 22. The removable filter 86 extends across the orifice channel 54 so that all refrigerant flowing through the channel 54 will go through the filter 86. The removable filter 86, being adjacent to the larger diameter orifice inlet port 22, is easily removable for service or replacement.

The operation of the vehicle air conditioning system 12 and refrigerant expansion assembly 24 of FIGS. 1-3 will now be discussed. The compressor 14 is activated, compressing and pushing the refrigerant through the system 12. Air flowing through the condenser 18 absorbs heat from the refrigerant before it flows into the expansion assembly 24. As the refrigerant flows into the orifice inlet port 22, it flows through the removable filter 86, which traps impurities. The refrigerant then flows through the orifice channel 54, with the fixed orifice 56 regulating the refrigerant flow and causing a drop in refrigerant pressure. The refrigerant then flows out through the orifice outlet port 28 on its way to the evaporator 30, where the refrigerant absorbs heat. The refrigerant then travels from the evaporator 30, and through the return inlet port 40, refrigerant return channel 52, and return outlet port 44 on its way back to the compressor 14 to complete the cycle.

When operating the vehicle air conditioning system 12 with high pressure refrigerants (such as carbon dioxide), there may be times when the refrigerant pressure is higher than is desirable. The orifice bypass valve 68 and the pressure relief valve 82 provide system protection by relieving the overpressure.

When the refrigerant pressure exceeds a first predetermined threshold, the pressure pushing up on the check ball 70 through the upstream bypass channel 58 will overcome the bias of the coil spring 74, pushing the bypass piston 72 upward and lifting the check ball 70 off of the valve seat 60. A stem 73 extending upward on the bypass piston 72 can contact the spring retention nut 76 to limit the upward travel of the bypass piston 72. With the check ball 70 lifted from the valve seat 60, the refrigerant will flow through the upstream bypass channel 58, bypass chamber 62 and downstream bypass channel 66, bypassing the fixed orifice 56 and thus relieving some of the pressure. When the refrigerant pressure drops below the first predetermined threshold, the bias of the coil spring 74 will cause the bypass piston 72 to press the check ball 70 into sealing engagement with the valve seat 60, thus forcing all of the refrigerant to again flow through the fixed orifice 56 rather than through the orifice bypass valve 68.

When the refrigerant pressure exceeds a second, higher predetermined threshold, this is an indication that, even though the orifice bypass valve 68 is allowing for some pressure relief, the refrigerant pressure is too high and may be at a level where damage to the evaporator 30 can occur. The burst disk 84 is sized and shaped so that, when the pressure exceeds this second predetermined threshold, the burst disk 84 cracks open, allowing the overpressure refrigerant to escape through the pressure relief valve to atmosphere.

Figure 5:
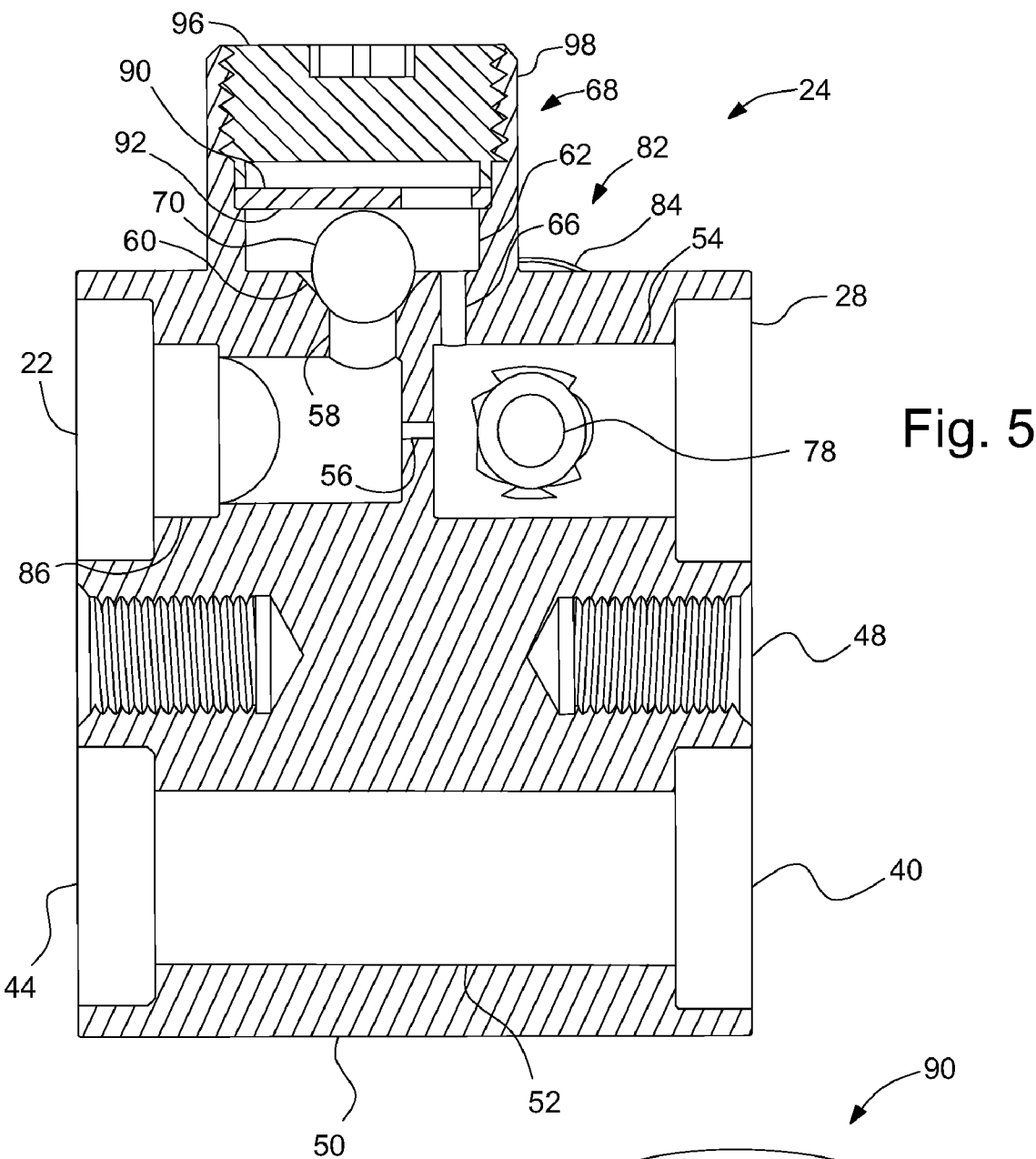
FIG. 5 is a partially sectional view taken along line 5-5 in FIG. 4.
Figure 6:
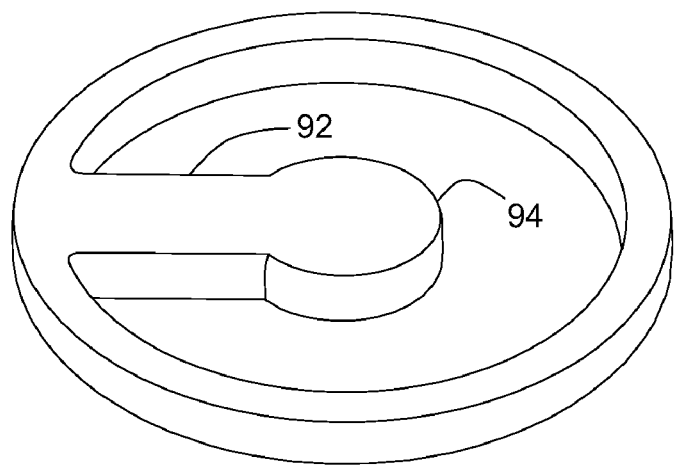
FIG. 6 is a perspective view of a plate spring employed in the refrigerant expansion assembly of the second embodiment.

FIGS. 4-6 illustrate a second embodiment. Since this embodiment is similar to the first, similar element numbers will be used for similar elements, and the detailed description thereof will be omitted. In this embodiment, the orifice bypass valve 68 is modified to provide a different means of biasing the check ball 70 onto the valve seat 60.

A plate spring 90 is mounted in the bypass valve flange 98 and secured in place by screwing the spring retention nut 96 into the bypass valve flange 98. The plate spring 90 includes a ball contact tab 94 that is aligned and in contact with the check ball 70 and a flexing member that supports the ball contact tab 94 in a cantilevered fashion. The plate spring 90 is more compact than a coil spring and can have its spring rate changed relatively easily by changing a thickness and/or width of the flexing member 92. Also, the more compact plate spring 90 allows for the spring retention nut 96 to be screwed inside of the bypass valve flange 98, thus providing for a more compact overall refrigerant expansion assembly 24.

While certain embodiments of the present invention have been described in detail, those familiar with the art to which this invention relates will recognize various alternative designs and embodiments for practicing the invention as defined by the following claims.

What is claimed is:

1. A refrigerant expansion assembly for use in a vehicle air conditioning system configured for refrigerant flow in a direction of adiabatic expansion comprising:

a main body including an orifice inlet port, an orifice outlet port, an orifice channel extending between the orifice inlet port and the orifice outlet port and including a fixed orifice, an upstream bypass channel extending at a non-parallel angle from the orifice channel between the orifice inlet port and the fixed orifice and including a ball valve seat, and a downstream bypass channel extending at a non-parallel angle from the orifice channel between the fixed orifice and the orifice outlet port, the upstream bypass channel connecting to the orifice channel upstream of the fixed orifice in a refrigerant flow direction of adiabatic expansion;

a bypass valve flange extending from the main body and forming a bypass chamber therein, the bypass chamber connected to the upstream bypass channel and the downstream bypass channel, with the ball valve seat adjacent to the bypass chamber;

a check ball mounted in the bypass chamber adjacent to the ball valve seat, the ball valve seat and check ball configured to completely prevent all refrigerant flow in a direction opposite to the direction of refrigerant flow for adiabatic expansion for all expansion assembly operating conditions; and a spring operatively engaging the check ball to bias the check ball into the ball valve seat, whereby when a refrigerant pressure in the upstream bypass channel exceeds a first predetermined pressure threshold, the check ball is moved away from the ball valve seat against the bias of the spring allowing for refrigerant flow through the upstream and downstream bypass channels in the same direction of flow as refrigerant flow for adiabatic expansion.

2. The refrigerant expansion assembly of claim 1 including a bypass piston, and wherein the spring is a coil spring that operatively engages the bypass piston into contact with the check ball.

3. The refrigerant expansion assembly of claim 2 including a spring retention nut threadably received on the bypass valve flange to thereby secure the coil spring in the bypass chamber.

4. The refrigerant expansion assembly of claim 1 wherein the spring is a plate spring having a ball contact tab in surface contact with the check ball and a flexing member supporting the ball contact tab in biased engagement with the check ball.

5. The refrigerant expansion assembly of claim 4 including a spring retention nut threadably received inside the bypass valve flange and securing the plate spring in the bypass chamber.

6. The refrigerant expansion assembly of claim 1 wherein the main body includes a return inlet port and a return outlet port connected by a refrigerant return channel that extends parallel to the orifice channel, the main body including a wall that prevents pressure communication between the refrigerant return channel and the orifice channel.

7. The refrigerant expansion assembly of claim 6 wherein the main body includes a pair of mounting bores configured to secure the main body in a fixed relation to a vehicle.

8. The refrigerant expansion assembly of claim 1 including a pressure relief outlet channel connecting to the orifice channel between the fixed orifice and the orifice outlet port, and a burst disk enclosing an end of the pressure relief outlet channel, whereby when a refrigerant pressure adjacent to the pressure relief outlet channel exceeds a second predetermined pressure threshold that is higher than the first predetermined pressure threshold, the burst disk will burst, allowing a refrigerant to escape to atmosphere.

9. The refrigerant expansion assembly of claim 1 including a refrigerant filter removably mounted in the orifice channel adjacent to the orifice inlet port and configured to be removable through the orifice inlet port.

10. A vehicle air conditioning system comprising:

a refrigerant compressor;

a condenser configured to receive a refrigerant from the refrigerant compressor;

an evaporator; and a refrigerant expansion assembly including an orifice inlet port configured to receive the refrigerant from the condenser in a refrigerant flow direction of adiabatic expansion through the refrigerant expansion assembly, an orifice outlet port that directs the refrigerant to the evaporator, an orifice channel extending between the orifice inlet port and the orifice outlet port and including a fixed orifice, an upstream bypass channel extending at a non-parallel angle from the orifice channel between the orifice inlet port and the fixed orifice and including a ball valve seat, and a downstream bypass channel extending at a non-parallel angle from the orifice channel between the fixed orifice and the orifice outlet port; a bypass valve flange extending from the main body and forming a bypass chamber therein, the bypass chamber connected to the upstream bypass channel and the downstream bypass channel, with the ball valve seat adjacent to the bypass chamber; a check ball mounted in the bypass chamber adjacent to the ball valve seat, the ball valve seat and check ball configured to completely prevent all refrigerant flow in a direction opposite to the direction of refrigerant flow for adiabatic expansion for all expansion assembly operating conditions; and a spring operatively engaging the check ball to bias the check ball into the ball valve seat, whereby when a refrigerant pressure in the upstream bypass channel exceeds a first predetermined pressure threshold, the check ball is moved away from the ball valve seat against the bias of the spring allowing for refrigerant flow through the upstream and downstream bypass channels in the same direction of flow as refrigerant flow for adiabatic expansion.

11. The vehicle air conditioning system of claim 10 including a bypass piston mounted in the bypass chamber, and wherein the spring is a coil spring that operatively engages the bypass piston into contact with the check ball.

12. The vehicle air conditioning system of claim 10 wherein the spring is a plate spring having a ball contact tab in surface contact with the check ball and a flexing member supporting the ball contact tab in biased engagement with the check ball.

13. The vehicle air conditioning system of claim 10 wherein the main body includes a return inlet port that receives the refrigerant from the evaporator and a return outlet port connected by a refrigerant return channel that extends parallel to the orifice channel, the return outlet port directing the refrigerant to the refrigerant compressor, the main body including a wall that prevents pressure communication between the refrigerant return channel and the orifice channel.

14. The vehicle air conditioning system of claim 10 including a pressure relief outlet channel connecting to the orifice channel between the fixed orifice and the orifice outlet port, and a burst disk enclosing an end of the pressure relief outlet channel, whereby when a refrigerant pressure adjacent to the pressure relief outlet channel exceeds a second predetermined pressure threshold that is higher than the first predetermined pressure threshold, the burst disk will burst, allowing a refrigerant to escape to atmosphere.

15. The vehicle air conditioning system of claim 10 including a refrigerant filter removably mounted in the orifice channel adjacent to the orifice inlet port and configured to be removable through the orifice inlet port.

16. A method of operating a vehicle air conditioning system having a refrigerant expansion assembly, the method comprising the steps of:
  (a) directing a refrigerant, in a direction of adiabatic expansion through the refrigerant assembly, through an orifice inlet port, an orifice channel, having a fixed orifice, and an orifice outlet port prior to directing the refrigerant into an evaporator;
  (b) applying a refrigerant pressure to a check ball, against a bias of a spring, upstream of the fixed orifice;
  (c) pushing the check ball against the bias of the spring into an open position when the refrigerant pressure exceeds a first predetermined pressure threshold, allowing the refrigerant to flow, in the direction of refrigerant flow through the refrigerant expansion assembly that is the same direction as adiabatic expansion refrigerant flow, past the check ball through a bypass chamber to thereby bypass the fixed orifice; and
  (d) the spring biasing the check ball into a closed position when the refrigerant pressure drops below the first predetermined pressure threshold, thereby forcing all of the refrigerant to flow through the fixed orifice.

17. The method of claim 16 further comprising the steps of:
  (e) providing a removable filter adjacent to the orifice inlet port;
  (f) directing all of the refrigerant flowing through the orifice channel through the removable filter;
  (g) detecting when the filter is clogged; and
  (h) removing and replacing the filter when the filter is detected as clogged.

18. The method of claim 16 further comprising the steps of:
  (e) applying the refrigerant pressure against a burst disk, downstream of the fixed orifice; and
  (f) bursting the burst disk, allowing the refrigerant to flow to atmosphere, when the refrigerant pressure acting against the burst disk exceeds a second predetermined pressure threshold that is greater than the first predetermined pressure threshold.

19. The method of claim 16 wherein step (c) is further defined by pressing the check ball against a bypass piston to thereby move the bypass piston against the bias of the spring, wherein the spring is a coil spring.

20. The method of claim 16 wherein the spring is a plate spring and step (c) is further defined by pressing the check ball against a ball contact tab on the plate spring to thereby flex a flexing member cantilevered out into engagement with the ball contact tab.

* * * * *